United States Patent
Tsotsis

(10) Patent No.: US 12,492,506 B2
(45) Date of Patent: Dec. 9, 2025

(54) FABRICATING METHODS AND APPARATUSES FOR A MULTILAYERED, NANOPARTICLE-COATED FIBER MATERIAL

(71) Applicant: The Boeing Company, Arlington, VA (US)

(72) Inventor: Thomas K. Tsotsis, Santa Ana, CA (US)

(73) Assignee: The Boeing Company, Arlington, VA (US)

( * ) Notice: Subject to any disclaimer, the term of this patent is extended or adjusted under 35 U.S.C. 154(b) by 1 day.

(21) Appl. No.: 18/333,866

(22) Filed: Jun. 13, 2023

(65) Prior Publication Data
US 2024/0417915 A1    Dec. 19, 2024

(51) Int. Cl.

| D06M 11/77 | (2006.01) |
|---|---|
| D06B 3/10 | (2006.01) |
| D06M 10/06 | (2006.01) |
| D06M 11/46 | (2006.01) |
| D06M 11/74 | (2006.01) |
| D06M 11/80 | (2006.01) |
| D06M 23/08 | (2006.01) |
| D06M 101/40 | (2006.01) |

(52) U.S. Cl.
CPC ............... *D06M 11/74* (2013.01); *D06B 3/10* (2013.01); *D06M 10/06* (2013.01); *D06M 11/46* (2013.01); *D06M 11/77* (2013.01); *D06M 11/80* (2013.01); *D06M 23/08* (2013.01); *D06M 2101/40* (2013.01); *D06M 2400/00* (2013.01)

(58) Field of Classification Search
CPC ... D06M 11/74; D06M 11/77; C04B 41/4549; C04B 35/62894; C04B 35/83; B05D 1/007
See application file for complete search history.

(56) References Cited

U.S. PATENT DOCUMENTS

| 4,748,079 | A | 5/1988 | Thebault |
|---|---|---|---|
| 5,039,635 | A | 8/1991 | Stempin et al. |
| 6,506,483 | B1 | 1/2003 | Fehrenbacher et al. |
| 11,420,904 | B2 | 8/2022 | De Luca et al. |
| 2005/0233127 | A1 | 10/2005 | Steffier |
| 2012/0156389 | A1* | 6/2012 | Kotov ............... B82Y 40/00 427/415 |
| 2019/0322595 | A1 | 10/2019 | Magdefrau et al. |
| 2023/0130304 | A1* | 4/2023 | Tsotsis ............... B33Y 40/20 264/603 |

FOREIGN PATENT DOCUMENTS

| CN | 114207887 | * 3/2022 |
|---|---|---|
| WO | 2020222013 A1 | 11/2020 |

OTHER PUBLICATIONS

European Patent Office, Extended European Search Report, App. No. 24177376.1 (Nov. 13, 2024).

* cited by examiner

*Primary Examiner* — Tabassom Tadayyon Eslami
(74) *Attorney, Agent, or Firm* — Walters & Wasylyna LLC

(57) ABSTRACT

A fabricating method is provided for a multilayered, nanoparticle-coated fiber material using a layer-by-layer nanoparticle-deposition system. Fabrication includes coating a fiber substrate with a first type of nanoparticle to provide a first coated layer of the multilayered, nanoparticle-coated fiber material. Fabrication also includes coating the first coated layer with a second type of nanoparticle to provide a second coated layer of the multilayered, nanoparticle-coated fiber material.

20 Claims, 8 Drawing Sheets

FABRICATING METHODS AND APPARATUSES FOR A MULTILAYERED, NANOPARTICLE-COATED FIBER MATERIAL

FIELD

The present disclosure generally relates to coated materials and, more particularly, to fabricating methods and apparatuses for a multilayered, nanoparticle-coated fiber material.

BACKGROUND

Materials containing one or more coated layers, such as coated fibers, made by known fabricating methods are prone to unevenness of the one or more coated layers.

As an example, pyrolytic-carbon (pyC) coatings on fibers are prone to unevenness of one or more coatings, resulting in variable composite-material strength when the coated fibers are combined with ceramic matrices to make ceramic-matrix composites (CMCs). The intent of pyC coatings in CMCs is to create a weak interface between the matrix and the fiber to allow for the fiber to move relative to the matrix under certain loads, thereby allowing the composite to deform and carry more load than is possible with a strong fiber-matrix interface.

Moreover, pyC coatings need to be applied using chemical vapor deposition (CVD), which requires specialized equipment and controlled temperature and pressure.

However, another drawback to pyC coatings is the inability to apply these coatings continuously. Batch processing must be used, meaning that the length of fiber that may be coated is limited by the size of the CVD chamber.

The result is higher fabrication costs and the inability to continuously coat fibers when CVD is used to apply pyC coatings on the fibers that are subsequently combined with ceramic matrices to make CMCs.

Despite advances already made, those skilled in the art continue with research and development efforts in the field of fabricating coated materials, such as coated-fiber materials used in making CMCs.

SUMMARY

Disclosed are fabricating methods for a multilayered, nanoparticle-coated fibers.

In one example, the disclosed fabricating method includes coating a fiber substrate with a first type of nanoparticle to provide a first coated layer of the multilayered, nanoparticle-coated fiber material. Fabrication also includes coating the first coated layer with a second type of nanoparticle to provide a second coated layer of the multilayered, nanoparticle-coated fiber material.

In another example, the disclosed fabricating method includes treating a surface of each of a plurality of fibers to impart an ionic charge polarity onto the surface. Fabrication also includes coating the surface of each of the plurality of fibers with nanoparticles having an ionic charge polarity opposite the ionic charge polarity of the surface of each of the plurality of fibers to provide a first layer of a multilayered, nanoparticle-coated plurality of fibers. Fabrication further includes coating the first layer with nanoparticles having an ionic charge polarity opposite the ionic charge polarity of the first layer to provide a second layer of the multilayered, nanoparticle-coated plurality of fibers.

Also disclosed are carbon fibers and ceramic-matrix composites made according to fabrications.

Also disclosed are fabricating apparatuses for a multilayered, nanoparticle-coated fiber material.

In one example, the fabricating apparatus includes a first coating vessel containing a first nanoparticle-based solution, through which a substrate can pass to impart a first coating of nanoparticles onto the substrate. The fabricating apparatus also includes a second coating vessel containing a second nanoparticle-based solution through which the substrate with the first coating of nanoparticles can pass to impart a second coating of nanoparticles onto the substrate coated with the first coating of nanoparticles and thereby to provide the multilayered, nanoparticle-coated fiber material.

Other examples of the disclosed fabricating methods and apparatuses will become apparent from the following detailed description, the accompanying drawings and the appended claims.

DETAILED DESCRIPTION

The present application is directed to fabrication apparatuses and methods using a layer-by-layer (LBL) deposition system. The specific construction of an apparatus and method therefor and the industry in which the apparatus and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a fabrication apparatus and method for a multilayered, nanoparticle-coated fiber material that is used in the manufacture of aerospace parts. The apparatus and method may be implemented by an original equipment manufacturer (OEM)

in compliance with military and space regulations. It is conceivable that the disclosed apparatus and method may be implemented in many other industries.

Figure 1:
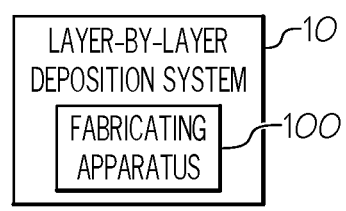
FIG. 1 is a schematic block diagram of a layer-by-layer (LBL) deposition system embodying a fabricating apparatus for a multilayered, nanoparticle-coated fiber material.

Referring to FIG. 1, a schematic block diagram of a layer-by-layer deposition system 10 is illustrated. The layer-by-layer deposition system 10 embodies an apparatus 100 for fabricating a multilayered, nanoparticle-coated fiber material and constructed in accordance with an example implementation. An example fiber material comprises carbon fiber material. Other types of fiber material are possible.

Figure 2A:
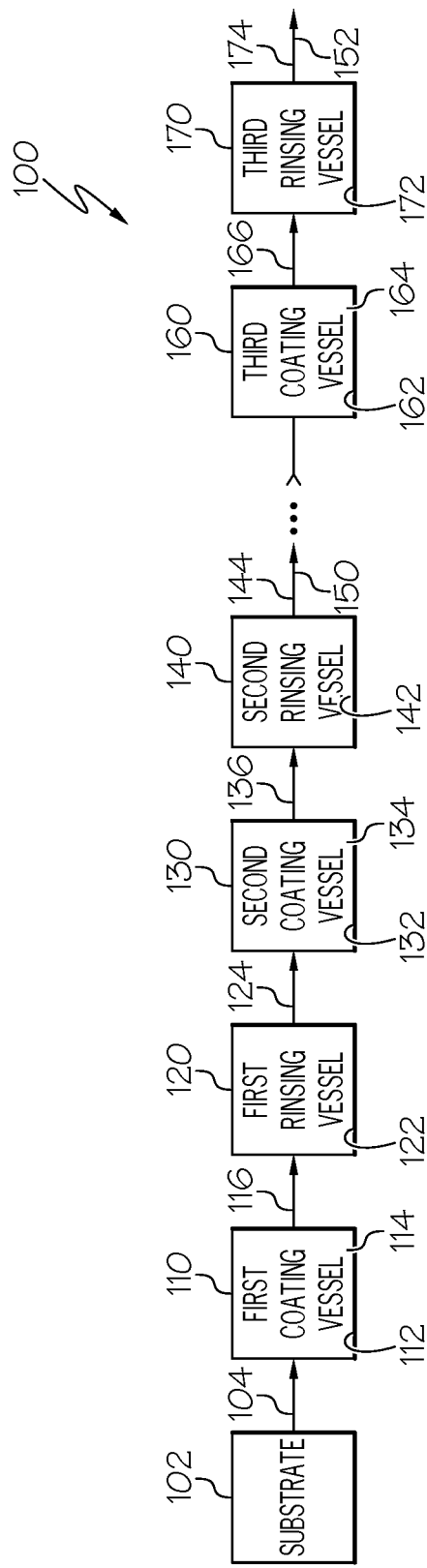
FIG. 2A is a schematic view of the fabricating apparatus of FIG. 1 constructed in accordance with an example implementation.

Referring to FIG. 2A, a schematic view of the fabricating apparatus 100 is illustrated. The fabricating apparatus 100 includes a first coating vessel 110 containing a first nanoparticle-based solution 112 through which a fiber substrate 102 (e.g., a carbon-fiber material) can pass along a pathway 104 (e.g., a fiber-production line or a fiber-handling pathway that uses roll-to-roll processing) to impart a first coating of nanoparticles 114 onto the fiber substrate 102 to provide a first coated substrate 116. In other words, the fiber substrate 102 is imparted with the first coating of nanoparticles 114 to form a monolayer of the first coating of nanoparticles 114. The fiber substrate 102 has an ionic charge polarity (i.e., either a cationic charge or an anionic charge), and can be treated (e.g., an acid or base wash, or plasma) to impart such ionic charge. Nanoparticles contained in the first coating vessel 110 have an ionic charge polarity opposite the ionic charge polarity of the fiber substrate 102. Nanoparticles contained in the first coating vessel 110 may be selected from graphene, BN, SiN, TIC, $TiO_2$, and combinations and mixtures thereof. Other types of nanoparticle materials are possible. The first nanoparticle-based solution 112 includes a polymer that acts as a carrying agent for the nanoparticles contained in the first coating vessel 110.

Figure 2B:
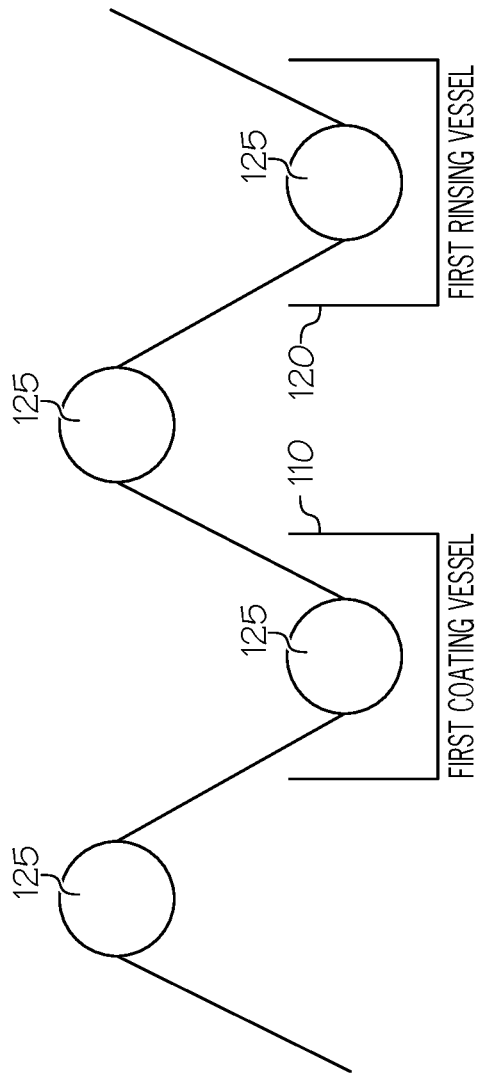
FIG. 2B is a schematic diagram showing an example relationship between a coating vessel and a rinsing vessel of the fabricating apparatus of FIG. 2A.

The fabricating apparatus 100 also includes a first rinsing vessel 120 containing a rinsing solution 122 (e.g., an aqueous solution) for rinsing the first coated substrate 116 to provide a first rinsed coated substrate 124, which is then allowed to dry. Drying may be performed at ambient conditions or at an elevated temperature. An example relationship between the first coating vessel 110 and the first rinsing vessel 120 is shown in FIG. 2B, wherein a number of rollers 125 are used to provide a production-line type of setup.

More specifically, the first rinsing vessel 120 contains a solution possessing no nanoparticles, through which the fiber substrate 102 with the first coating of nanoparticles 114 can pass to remove excess nanoparticles from the first coating of nanoparticles 114 from the fiber substrate 102, leaving only those adhered to the fiber substrate 102. The first rinsed coated substrate 124 forms a monolayer of the first coating of nanoparticles 114. The monolayer of the first coating of nanoparticles 114 has a thickness between about 5 nanometers and about 1000 nanometers, such as from about 100 nanometers to about 500 nanometers, or from about 200 nanometers to about 400 nanometers.

The fabricating apparatus 100 further includes a second coating vessel 130 containing a second nanoparticle-based solution 132 through which the first rinsed coated substrate 124 can pass to impart a second coating of nanoparticles 134 onto the first rinsed coated substrate 124 to provide a second coated substrate 136. Nanoparticles contained in the second coating vessel 130 have an ionic charge polarity like the ionic charge polarity of the fiber substrate 102 (e.g., carbon fiber), and thus an ionic charge polarity that is opposite the ionic charge polarity of the nanoparticles contained in the first coating vessel 110. Nanoparticles contained in the second coating vessel 130 may be selected from at least one of graphene, BN, SiN, TIC, $TiO_2$, and mixtures or combinations thereof. Other types of nanoparticle materials are possible. The second nanoparticle-based solution 132 includes a polymer that acts as a carrying agent for the nanoparticles contained in the second coating vessel 130.

The fabricating apparatus 100 also includes a second rinsing vessel 140 containing a rinsing solution 142 (e.g., an aqueous solution) for rinsing the second coated substrate 136 to provide a second rinsed coated substrate 144, which is then allowed to dry (e.g., at ambient conditions or at an elevated temperature).

More specifically, the second rinsing vessel 140 contains a second nanoparticle-free solution through which the fiber substrate 102 with the first and second coatings of nanoparticles 114, 134 can pass to remove the excess particles from the second coating of nanoparticles 134 from the fiber substrate 102 coated with the first coating of nanoparticles 114 to leave only the nanoparticles from the second coating that are adhered to the nanoparticles from the first coating, which are adhered to the fiber substrate 102. The second rinsed coated substrate 144 forms a monolayer of the second coating of nanoparticles 134. The monolayer of the second coating of nanoparticles 134 has a thickness between about 5 nanometers and about 1000 nanometers, such as from about 100 nanometers to about 500 nanometers, or from about 200 nanometers to about 400 nanometers. After the fiber substrate 102 passes through the first coating vessel 110, the first rinsing vessel 120, the second coating vessel 130, and the second rinsing vessel 140, as described hereinabove, the result is a fabricated multilayered, nanoparticle-coated fiber material 150 (i.e., the second rinsed coated substrate 144 after it has dried).

Figure 3A:
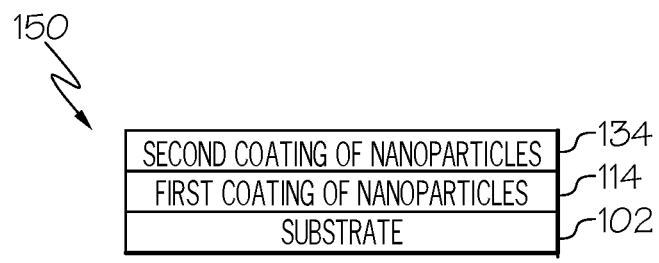
FIG. 3A is a schematic elevational view of different layers of a fabricated multilayered, nanoparticle-coated fiber material.

Referring to FIG. 3A, a schematic elevational view of different layers of the fabricated, multilayered, nanoparticle-coated fiber material 150 is illustrated. The monolayer of the first coating of nanoparticles 114 is disposed on the fiber substrate 102, and the monolayer of the second coating of nanoparticles 134 is disposed on first coating of nanoparticles 114. Since the monolayer of the first coating of nanoparticles 114 has an ionic charge polarity that is opposite to the ionic charge polarity of the fiber substrate 102 and ionic charge polarity of the second coating of nanoparticles 134, strong bonds are provided with the layers above and below.

Figure 3B:
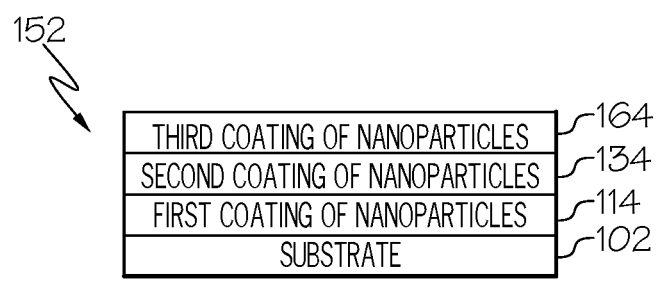
FIG. 3B is a schematic elevational view of different layers of another fabricated multilayered, nanoparticle-coated fiber material.

Although the above describes only two coating and rinsing cycles, this process can be repeated as many times as desired to achieve a desired number of deposited layers, a desired coating density, and/or handleability of the fiber material or fabric of fiber material. For example, referring again to FIG. 2A, the fabricating apparatus 100 may further comprise a third coating vessel 160 containing a third nanoparticle-based solution 162 through which the second rinsed coated substrate 144 can pass to impart a third coating of nanoparticles 164 onto the second rinsed coated substrate 144 to provide a third coated substrate 166. The fabricating apparatus 100 also comprises a third rinsing vessel 170 containing a rinsing solution 172 (e.g., an aqueous solution) for rinsing the third coated substrate 166 to provide a third rinsed, coated substrate 174, which is then allowed to dry. The dried, third, rinsed, coated substrate 174 comprises a thicker multilayered, nanoparticle-coated fiber material 152. The thicker multilayered, nanoparticle-coated fiber material 152, as shown in FIG. 3B, has another monolayer of nanoparticles (i.e., the third coating of nanoparticles 164) in addition to the monolayer of the first coating of nanoparticles 114 and the monolayer of the second coating of nanoparticles 134 on the fiber substrate 102.

Figure 2C:
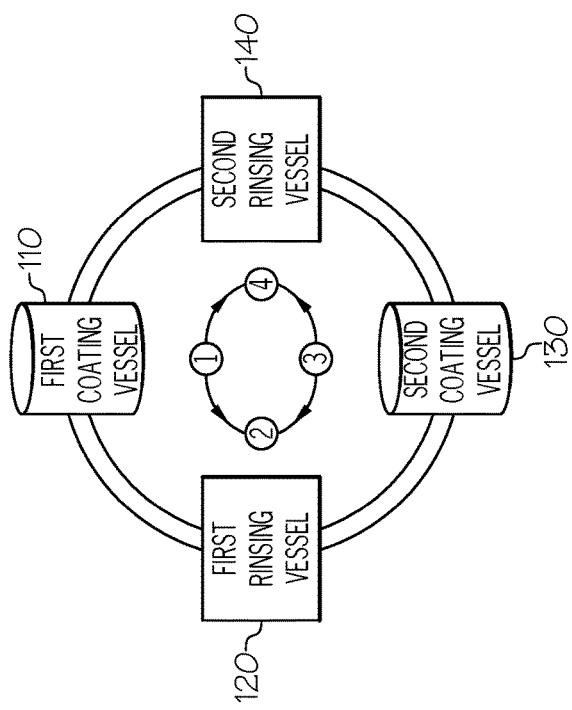
FIG. 2C is a schematic diagram of an example minimal-size production-line setup of the fabricating apparatus of FIG. 2A.

Although the above description describes a production-line setup, it is conceivable that the production pathway and vessels may be arranged to allow the fibers to be exposed to the same nanoparticle solution or the same rinsing solution multiple times to minimize the number of solution vessels and rinsing vessels needed so as to minimize the size of the setup. An example minimal-size production-line setup is shown in FIG. 2C. As shown in FIG. 2C, the first coating vessel 110, the first rinsing vessel 120, the second coating vessel 130, and the second rinsing vessel 140 are arranged in a circular-shaped production-line setup that can be repeated as many times as desired. In addition, excess nanoparticles contained in rinsing vessels can be removed and recycled to minimize costs.

It should be apparent that a layer-by-layer deposition system is arranged to impart multiple nanoparticle-coated layers onto fibers to create desired interface coatings between layers. As an example, the coating layers may comprise high-temperature materials, such as graphene nanoplatelets to create desirable weak interface coatings when fibers are to be coupled with ceramic matrices to form ceramic-matrix composites.

Each coating layer is self-assembled due to particle shape and electrical charge, and is deposited individually over the prior coating layer. The number of coating depositions can be repeated as many times as desired or needed, such as three times or five times. Other numbers of coating layers are possible. Each coating layer is also substantially uniform in thickness throughout to provide a substantially uniform strength with low variability along the length of each layer.

A multilayered, nanoparticle-coated fiber material fabricated in accordance with the present disclosure, such as shown in FIGS. 3A and 3B, can be post-processed for subsequent use. Post-processing may include exposure to heat, ultraviolet light, or other means to modify coatings so as to have more desirable handling properties or more desirable usage properties than the unprocessed fiber material. As an example, the fabricated multilayered, nanoparticle-coated fiber material 150, 152 may be put onto a creel to produce fabric that comprises fibers coated with nanoparticles. As another example, the fabricated, multilayered, nanoparticle-coated fiber material 150, 152 may be used as a reinforcement in a ceramic matrix for making composites. Post-processing equipment may be located at the end of the fiber-production line such as shown in FIG. 2A, or at a location that is away from the fiber-production line.

Figure 2D:
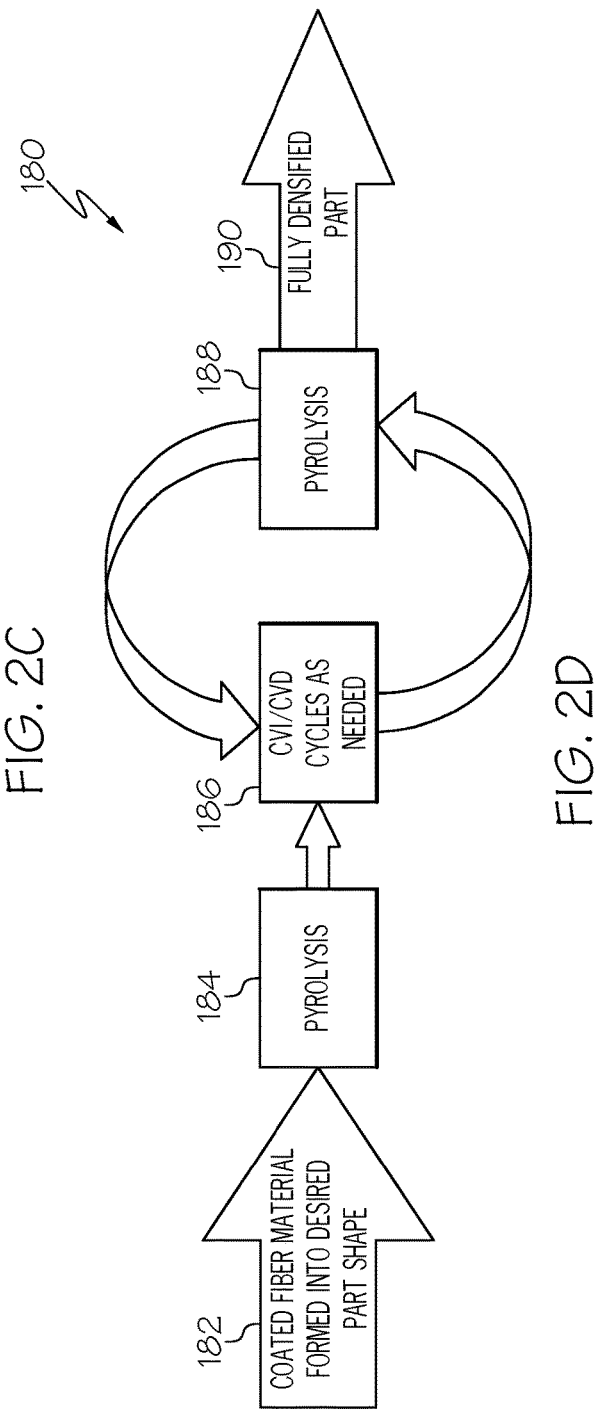
FIG. 2D is an example post-processing setup that can be used following the fabricating apparatus of FIG. 2A.

Referring to FIG. 2D, an example post-processing setup 180 that can be used following the fabricating apparatus 100 of FIG. 2A is illustrated. In block 182, the fabricated, multilayered, nanoparticle-coated fiber material 150, 152 of FIG. 3A or FIG. 3B is formed into a desired part shape before being subjected to a pyrolysis process in block 184. Then in block 186, as many cycles of a chemical vapor infiltration/chemical vapor deposition (CVI/CVD) process as needed can be applied before being subjected to another pyrolysis process as shown in block 188. The process of block 186 and the process of block 188 can also be repeated as many times as desired or needed before a fully-densified part 190 is provided by the post-processing setup 180.

Figure 4:
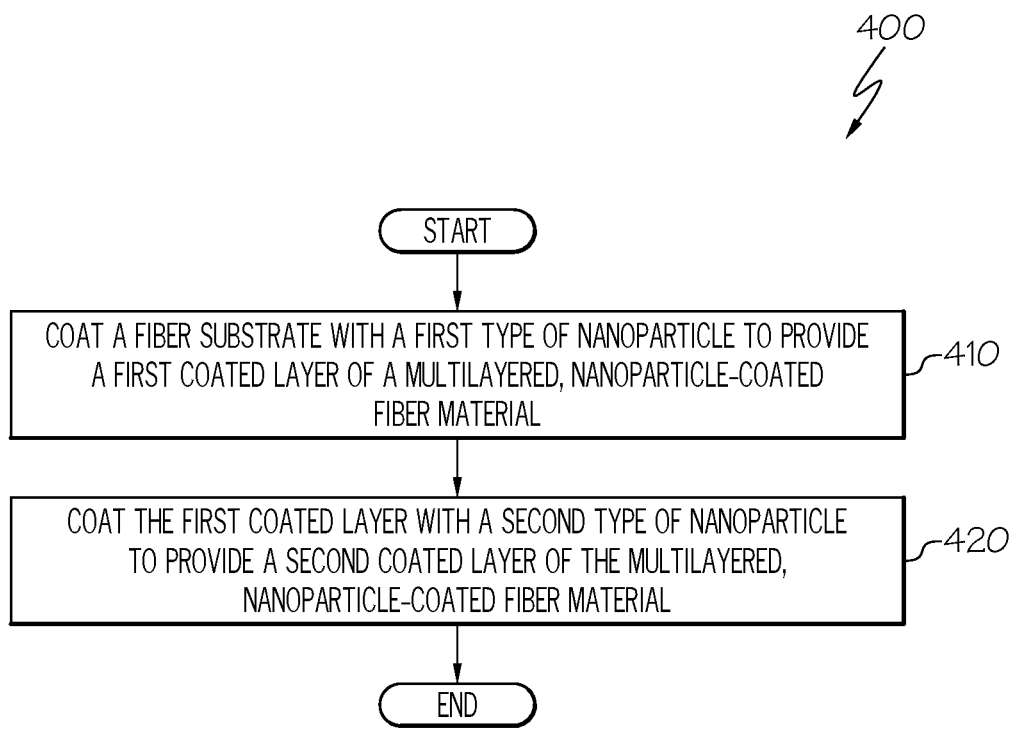
FIG. 4 is a flow diagram depicting a fabricating method in accordance with an example implementation.

Referring to FIG. 4, a flow diagram 400 of a fabricating method for a multilayered, nanoparticle-coated fibers using layer-by-layer, nanoparticle deposition in accordance with an example implementation is illustrated. In block 410, a fiber substrate is coated with a first type of nanoparticle to provide a first coated layer of a multilayered, nanoparticle-coated fiber material. The process proceeds to block 420 in which the first coated layer is coated with a second type of nanoparticle to provide a second coated layer of the multilayered, nanoparticle-coated fiber material. The process then ends.

In some embodiments, one or both of the first type of nanoparticle and the second type of nanoparticle comprise high-temperature nanoparticles. In some embodiments, the high-temperature nanoparticles comprise graphene nanoparticles.

In some embodiments, the layer-by-layer deposition is performed in a manner so as to deposit the nanoparticles onto surfaces of the fibers comprising a fabric.

In some embodiments, the layer-by-layer deposition is performed at ambient or near-ambient conditions.

In some embodiments, fabrication further comprises rinsing the first coated layer to form a monolayer of the first coated layer, and rinsing the second coated layer to form a monolayer of the second coated layer.

In some embodiments, each of the monolayers of the first and second coated layers has a thickness between about five nanometers and about 100 nanometers.

In some embodiments, fabrication further comprises coating the second coated layer with a third type of nanoparticle to provide a third coated layer of the multilayered, nanoparticle-coated material. In some embodiments, the third type of nanoparticle is the same type as the first type of nanoparticle.

In some embodiments, a carbon fiber is formed according to the disclosed fabrication method of FIG. 4.

Figure 5:
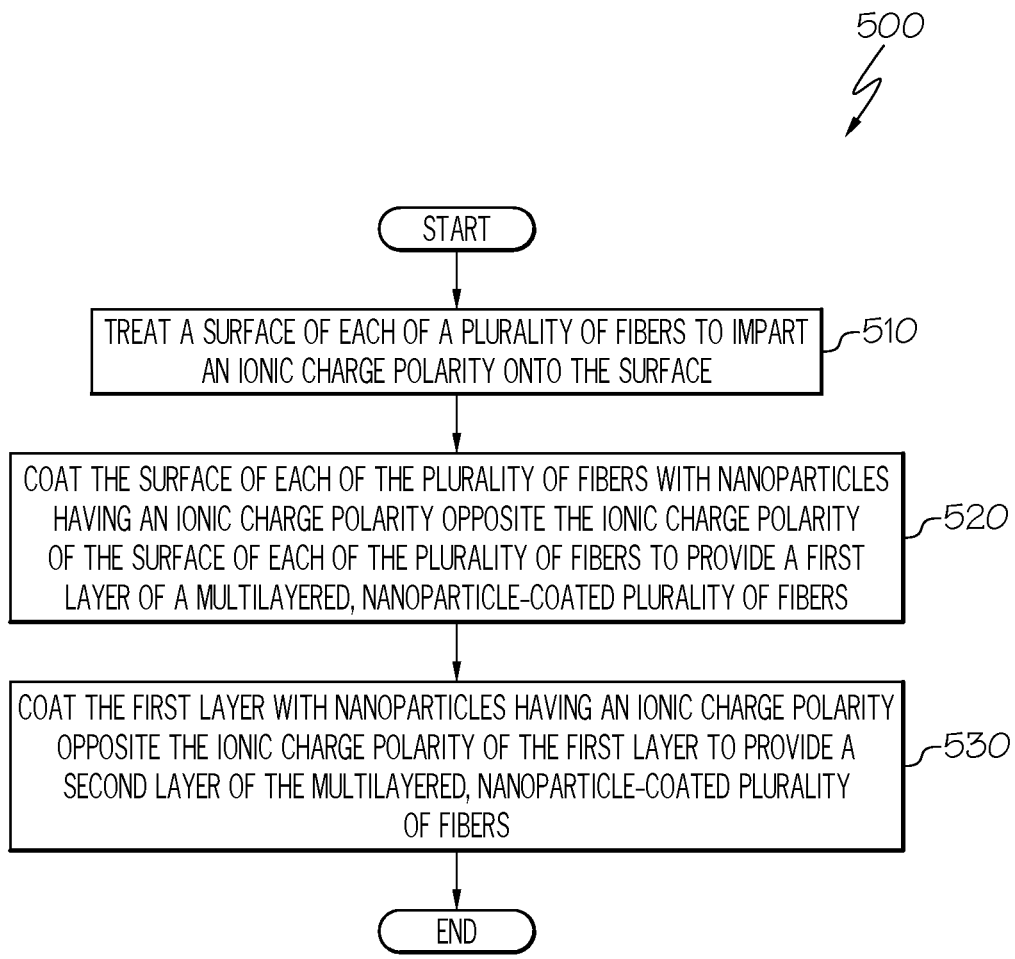
FIG. 5 is a flow diagram depicting a fabricating method in accordance with another example implementation.

Referring to FIG. 5, a flow diagram 500 of a fabrication method in accordance with another example implementation is illustrated. In block 510, a surface of each of a plurality of fibers is treated to impart an ionic charge polarity onto the surface. The process proceeds to block 520 in which the surface of each of the plurality of fibers is coated with nanoparticles having an ionic charge polarity opposite the ionic charge polarity of the surface of each of the plurality of fibers to provide a first layer of a multilayered, nanoparticle-coated plurality of fibers. Then in block 530, the first layer is coated with nanoparticles having an ionic charge polarity opposite the ionic charge polarity of the first layer to provide a second layer of the multilayered, nanoparticle-coated plurality of fibers. The process then ends.

In some embodiments, fabrication further comprises rinsing the first layer to form a monolayer of the first layer, and rinsing the second layer to form a monolayer of the second layer. Each of the monolayers of the first and second layers has a thickness between about five nanometers and about 100 nanometers.

In some embodiments, fabrication further comprises spreading the plurality of fibers to maximize surface areas that can be coated with nanoparticles.

In some embodiments, fabrication further comprises drying each of the first and second layers to modify a combination of handling and usage properties of the multilayered, nanoparticle-coated plurality of fibers.

In some embodiments, a ceramic-matrix composite is made according to the disclosed fabrication method of FIG. 5.

A number of advantages are provided by fabricating a multilayered, nanoparticle-coated fiber material as disclosed herein. One advantage is that high-temperature nanoparticles can be applied onto fibers at ambient or near-ambient conditions.

Another advantage is that very dense coatings of nanoparticles can be formed on fibers.

Still another advantage is that no specialized (and therefore usually expensive) equipment as well as no highly controlled conditions (e.g., temperature and pressure) are required to fabricate multilayered, nanoparticle-coated fibers disclosed herein.

Yet another advantage is that no batch processing is required, since the quantity of multilayered, nanoparticle-coated fiber material can be obtained as needed along a production-line setup, such as illustrated in FIG. 2A.

Figure 6:
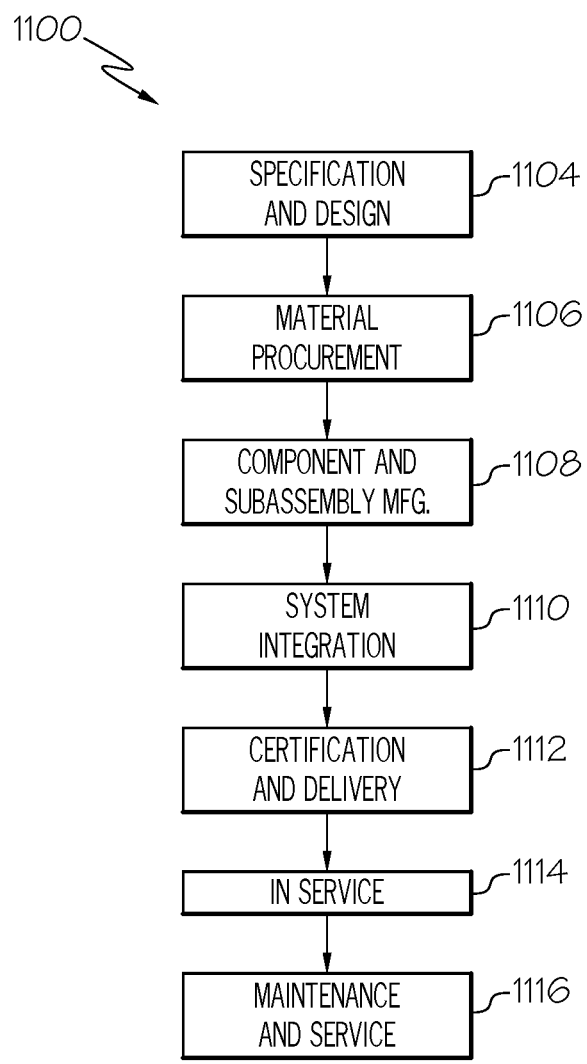
FIG. 6 is a block diagram of aircraft production and service methodology.
Figure 7:
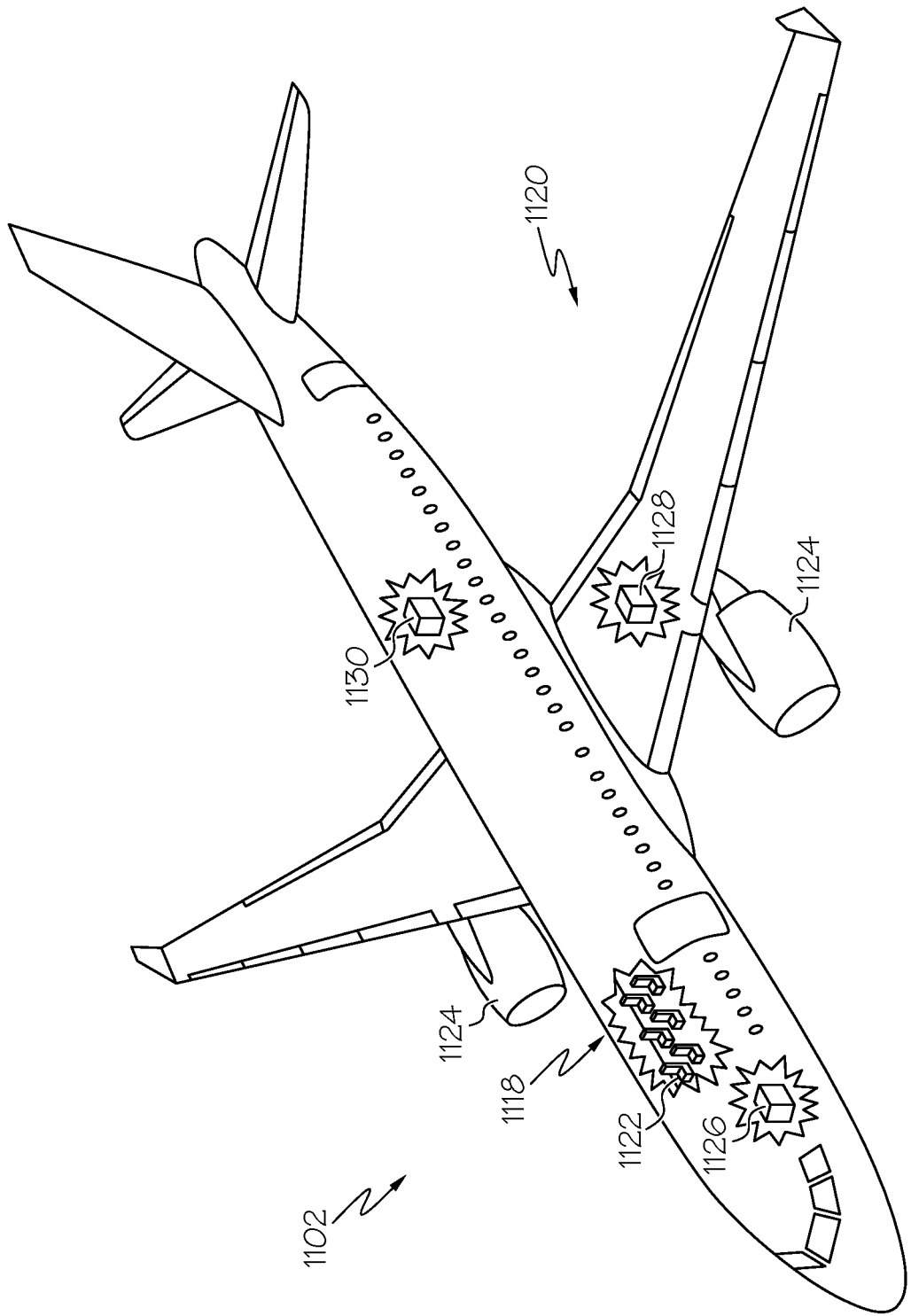
FIG. 7 is a schematic illustration of an aircraft.

Examples of the disclosure may be described in the context of an aircraft manufacturing and service method 1100, as shown in FIG. 6, and an aircraft 1102, as shown in FIG. 7. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

As shown in FIG. 7, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed apparatus and method may be employed during any one or more of the stages of the aircraft manufacturing and service method 1100. As one example, components or subassemblies corresponding to component/subassembly manufacturing 1108, system integration 1110, and/or maintenance and service 1116 may be assembled using the disclosed apparatus and method. As another example, the airframe 1118 may be constructed using the disclosed apparatus and method. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more apparatus examples, method examples, or a combination thereof may be utilized while the aircraft 1102 is in service, for example and without limitation, to maintenance and service 1116.

Different examples of the apparatus and method disclosed herein include a variety of components, features, and functionalities. It should be understood that the various examples of the apparatus and method disclosed herein may include any of the components, features, and functionalities of any of the other examples of the apparatus and method disclosed herein in any combination, and all of such possibilities are intended to be within the scope of the present disclosure.

The above-described apparatus and method are described in the context of an aircraft. However, one of ordinary skill in the art will readily recognize that the disclosed apparatus and method are suitable for a variety of applications, and the present disclosure is not limited to aircraft manufacturing applications. For example, the disclosed apparatus and method may be implemented in various types of vehicles including, for example, re-entry aerospace vehicles, high-speed aerospace vehicles, helicopters, passenger ships, automobiles, marine products (boat, motors, etc.) and the like. Non-vehicle applications are also contemplated.

Although the above-description describes an apparatus and method for fabricating a multilayered, nanoparticle-coated fiber material in the aviation industry in accordance with military and space regulations, it is contemplated that the apparatus and method may be implemented to facilitate for fabricating a multilayered, nanoparticle-coated fiber material in any industry in accordance with the applicable industry standards. The specific apparatus and method can be selected and tailored depending upon the particular application.

Further, although various examples of disclosed embodiments have been shown and described, modifications may occur to those skilled in the art upon reading the specification. The present application includes such modifications and is limited only by the scope of the claims.

What is claimed is:

1. A fabricating method comprising:
    treating a surface of each of a plurality of fibers of a fiber substrate to impart an ionic charge polarity onto the surface of each fiber;
    coating the surface of each of the plurality of fibers of the fiber substrate with nanoparticles having an ionic charge polarity opposite the ionic charge polarity of the surface of each of the plurality of fibers of the fiber substrate to provide a first layer of a multilayered, nanoparticle-coated fiber material to each of the plurality of fibers in the fiber substrate;
    coating the first layer with nanoparticles having an ionic charge polarity opposite the ionic charge polarity of the first layer to provide a second layer of the multilayered, nanoparticle-coated fiber material;
    forming the multilayered, nanoparticle-coated fiber material into a desired part shape;
    subjecting the formed multilayered, nanoparticle-coated fiber material to a pyrolysis process; and
    performing at least one of chemical vapor infiltration or chemical vapor deposition on the pyrolyzed fiber material.

2. The fabricating method of claim 1 further comprising:
    rinsing the first layer to form a monolayer of the first layer; and
    rinsing the second layer to form a monolayer of the second layer,
    wherein each of the monolayers of the first and second layers has a thickness between 5 nanometers and 1000 nanometers.

3. The fabricating method of claim 1 further comprising:
    spreading the plurality of fibers of the fiber substrate to maximize surface areas that can be coated with nanoparticles.

4. The fabricating method of claim 1 further comprising:
    drying each of the first and second layers to modify a combination of handling and usage properties of the multilayered, nanoparticle-coated fiber material.

5. The fabricating method of claim 1 wherein the first type of nanoparticle and the second type of nanoparticle are high-temperature-capable nanoparticles that are applied as coatings at ambient or near-ambient conditions.

6. The fabricating method of claim 2 wherein at least one of the rinsing of the first layer and the rinsing of the second layer are performed using an aqueous solution.

7. A fabricating method comprising:
    coating a fiber substrate with a first nanoparticle-based solution to form a first coated layer on the fiber substrate;
    coating the first coated layer with a second nanoparticle-based solution to form a second coated layer on the first coated layer, thereby forming a multilayered, nanoparticle-coated fiber substrate;

forming the multilayered, nanoparticle-coated fiber material into a desired part shape;
subjecting the formed multilayered, nanoparticle-coated fiber material to a pyrolysis process; and
performing at least one of chemical vapor infiltration or chemical vapor deposition on the pyrolyzed fiber material.

8. The method of claim 7, wherein the first and second nanoparticle-based solutions each comprise a polymer that acts as a carrying agent for the nanoparticles.

9. The method of claim 7, further comprising rinsing the first and second coated layers to form respective monolayers prior to combining the coated fiber substrate with the ceramic matrix.

10. The method of claim 9, wherein each monolayer has a thickness between about 5 nanometers and about 1000 nanometers.

11. The method of claim 7, wherein the fiber substrate comprises a carbon fiber material.

12. The method of claim 7, wherein the fiber substrate is treated to modify its surface prior to the first coating step.

13. A method for fabricating a ceramic-matrix composite part, comprising:
performing a layer-by-layer deposition process in which a fiber substrate is sequentially coated with oppositely charged nanoparticles, including:
coating the fiber substrate with a first type of nanoparticle having a first ionic charge polarity to provide a first coated layer;
rinsing the first coated layer to form a substantially uniform monolayer;
coating the first coated layer with a second type of nanoparticle having a second ionic charge polarity opposite the first ionic charge polarity to provide a second coated layer; and
rinsing the second coated layer to form a substantially uniform monolayer, thereby forming a multilayered, nanoparticle-coated fiber material;
forming the multilayered, nanoparticle-coated fiber material into a desired part shape;
subjecting the formed multilayered, nanoparticle-coated fiber material to a pyrolysis process;
performing at least one of chemical vapor infiltration or chemical vapor deposition on the pyrolyzed fiber material; and
repeating the pyrolysis process and the at least one of chemical vapor infiltration or chemical vapor deposition as needed to provide a fully densified ceramic-matrix composite part.

14. The method of claim 13, wherein the fiber substrate comprises carbon fiber material.

15. The method of claim 13, wherein one or both of the first and second types of nanoparticles comprise graphene, boron nitride (BN), silicon nitride (SiN), titanium carbide (TiC), titanium dioxide ($TiO_2$), and combinations thereof.

16. The method of claim 13, wherein each monolayer has a thickness between about 5 nanometers and about 1000 nanometers.

17. The method of claim 13, wherein the layer-by-layer deposition process is performed at ambient or near-ambient conditions.

18. The method of claim 13, wherein the pyrolysis process is performed before and after the at least one of chemical vapor infiltration or chemical vapor deposition.

19. The method of claim 13, further comprising subjecting the multilayered, nanoparticle-coated fiber material to post-processing comprising exposure to heat, ultraviolet light, or both.

20. The method of claim 13, wherein the ceramic-matrix composite part is an aircraft or aerospace component.

* * * * *